United States Patent
Rhodes et al.

(10) Patent No.: US 8,055,193 B2
(45) Date of Patent: Nov. 8, 2011

(54) UNDERWATER REMOTE SENSING

(75) Inventors: Mark Rhodes, Edinburgh (GB); Derek Wolfe, West Lothian (GB); Brendan Hyland, Edinburgh (GB)

(73) Assignee: WFS Technologies Ltd., Edinburgh (GB)

( * ) Notice: Subject to any disclaimer, the term of this patent is extended or adjusted under 35 U.S.C. 154(b) by 0 days.

(21) Appl. No.: 12/686,510

(22) Filed: Jan. 13, 2010

(65) Prior Publication Data

US 2010/0109933 A1    May 6, 2010

Related U.S. Application Data

(63) Continuation of application No. 11/454,630, filed on Jun. 15, 2006, now Pat. No. 7,711,322.

(60) Provisional application No. 60/690,964, filed on Jun. 15, 2005, provisional application No. 60/690,966, filed on Jun. 15, 2005, provisional application No. 60/690,959, filed on Jun. 15, 2005.

(30) Foreign Application Priority Data

Feb. 7, 2006  (GB) .................................. 0602398.0

(51) Int. Cl.
*H04B 13/02* (2006.01)

(52) U.S. Cl. .... 455/40; 455/427; 455/404.2; 455/456.1; 455/21.1; 455/406; 455/431; 455/502; 367/131; 367/142; 367/904; 342/357.09; 343/719; 340/572.7; 340/850

(58) Field of Classification Search .................... 455/40, 455/427, 404.2, 456.1, 12.1, 406, 431, 502; 367/131, 3; 340/572.7; 342/357.09; 395/125

See application file for complete search history.

(56) References Cited

U.S. PATENT DOCUMENTS

| 3,903,520 A | * | 9/1975 | Shostak | 342/22 |
| 5,295,119 A | * | 3/1994 | Sarac | 367/99 |
| 5,579,285 A | | 11/1996 | Hubert | 367/133 |
| 5,598,152 A | | 1/1997 | Scarzello et al. | 340/850 |
| 5,640,369 A | * | 6/1997 | Capell, Sr. | 367/88 |
| 5,729,134 A | | 3/1998 | Lavan et al. | 324/239 |
| 5,894,450 A | | 4/1999 | Schmidt et al. | 367/134 |
| 5,905,464 A | * | 5/1999 | Lanciaux | 342/443 |
| 5,952,958 A | * | 9/1999 | Speasl et al. | 342/357.395 |
| 6,016,119 A | * | 1/2000 | Krasner | 342/357.34 |
| 6,058,071 A | | 5/2000 | Woodall et al. | 367/3 |
| 6,125,080 A | | 9/2000 | Sonnenschein et al. | 367/134 |
| 6,130,859 A | | 10/2000 | Sonnenschein et al. | 367/134 |
| 6,154,179 A | | 11/2000 | Kohno | 343/719 |
| 6,472,983 B1 | * | 10/2002 | Grunder | 340/540 |
| 6,483,865 B1 | | 11/2002 | Beierle | 375/130 |

(Continued)

FOREIGN PATENT DOCUMENTS

GB    2163029 A    2/1986

(Continued)

*Primary Examiner* — Marceau Milord (74) *Attorney, Agent, or Firm* — Paul Davis; Goodwin Procter LLP (57) ABSTRACT

An underwater remote sensing system comprising a transmitter for transmitting an electromagnetic signal, a receiver for receiving an electromagnetic signal reflected from an object and determining means for determining the location of the object, wherein at least one of the transmitter and receiver is underwater. The determining means may be operable to determine the location of the object using signals received at three or more receiver positions. To do this, three or more receiver antennas may be provided. Alternatively, a single receiver antenna may be provided and moved between three or more different measurement locations.

17 Claims, 10 Drawing Sheets

U.S. PATENT DOCUMENTS

| | | | |
|---|---|---|---|
| 6,665,631 B2 * | 12/2003 | Steinbrecher | 702/159 |
| 6,677,757 B2 | 1/2004 | Fine et al. | 324/360 |
| 6,678,589 B2 * | 1/2004 | Robertson et al. | 701/21 |
| 6,687,188 B2 * | 2/2004 | Yang | 367/134 |
| 6,771,563 B1 * | 8/2004 | Bernard | 367/131 |
| 6,933,884 B2 * | 8/2005 | Martin et al. | 342/357.07 |
| 6,941,226 B2 * | 9/2005 | Estep | 701/213 |
| 6,967,574 B1 * | 11/2005 | Nelson | 340/551 |
| 7,091,854 B1 * | 8/2006 | Miao | 340/539.26 |
| 7,113,668 B2 * | 9/2006 | Sorum et al. | 385/27 |
| 7,148,691 B2 | 12/2006 | Nelson et al. | 324/326 |
| 7,148,791 B2 * | 12/2006 | Grisham et al. | 340/435 |
| 7,190,634 B2 * | 3/2007 | Lambert et al. | 367/128 |
| 7,233,795 B1 * | 6/2007 | Ryden | 455/445 |
| 7,236,880 B2 * | 6/2007 | Fager et al. | 701/209 |
| 7,327,306 B2 * | 2/2008 | Laroche | 342/126 |
| 7,339,522 B2 * | 3/2008 | Dobson | 342/387 |
| 7,379,388 B2 * | 5/2008 | Graham et al. | 367/118 |
| 7,382,687 B2 * | 6/2008 | Doolan | 367/118 |
| 7,496,002 B2 | 2/2009 | Vosburgh | 367/188 |
| 7,626,499 B2 * | 12/2009 | Burneske et al. | 340/539.13 |
| 7,711,322 B2 * | 5/2010 | Rhodes et al. | 455/40 |

FOREIGN PATENT DOCUMENTS

WO    WO 8704028    7/1987

\* cited by examiner

UNDERWATER REMOTE SENSING

CROSS-REFERENCE TO RELATED APPLICATIONS

This application is a continuation of U.S. Ser. No. 11/454,630 filed Jun. 15, 2006 now U.S. Pat. No. 7,711,322, which application claims the benefit of U.S. Ser. Nos. 60/690,964, 60/690,966 and 60/690,959, all filed Jun. 15, 2005, and is a continuation in part of GB0602398.0, filed Feb. 7, 2006, all of which applications are fully incorporated herein by reference.

FIELD OF USE

The present invention relates to the use of electromagnetic energy to detect the presence or otherwise of objects in water, the systems being operated submerged in the water.

BACKGROUND

Underwater detection and location has typically been accomplished using sonar techniques. Acoustic systems are degraded by noise and interference from a number of sources. They are also subject to multi-path effects and in some environments are virtually unusable.

SUMMARY OF INVENTION

According to one aspect of the present invention, there is provided an underwater remote sensing system comprising a transmitter for transmitting an electromagnetic signal, a receiver for receiving an electromagnetic signal reflected from an object and determining means for determining the location of the object using the received signal, wherein at least one of the transmitter and receiver is underwater.

In use, a probe or exploratory signal is transmitted from the transmitter through the water. In the event that there is an object in the transmitted signal propagation path, part of the transmitted signal is reflected. The reflections are picked up by the receiver, processed electronically, and used to determine the relative position of the object.

At least one of the receiver and transmitter may have a magnetic coupled antenna. At least one of the receiver and transmitter has an electrically insulated antenna. In this case, the insulated antenna may be surrounded by an impedance-matched low conductivity medium, for example distilled water.

In the underwater environment, using electrically insulated magnetic coupled antennas provides various advantages over the alternative of electrically coupled antennas. In far field electromagnetic propagation, the relationship between the electric and magnetic field is determined by the transmission media's characteristic impedance. An electrically coupled antenna launches a predominantly electric field that transitions to the characteristic impedance over an area known as the near field. Underwater attenuation is largely due to the effect of conduction on the electric field. Since electrically coupled antennas produce a higher E-field component, in the near field the radiated signal experiences higher attenuation. The same performance issues apply to a receive antenna. Magnetic coupled antennas do not suffer from these problems and so are more efficient under water than electrically coupled antennas. Using an electrically insulated antenna provides further advantages. This is because for a non-insulated antenna, there is a direct conduction path between it and the dissipative water. This leads to dissipation as the signal propagates along the antenna even before the electromagnetic signal is launched. Providing an electrically insulated antenna reduces this effect.

The determining means may be operable to determine the location of the object using the field strength at three or more receiver positions. Three or more receiver antennas may be provided and the determining means may be operable to determine the location of the object by comparison of the field strength of the signal received at each antenna. Alternatively, a single receiver antenna may be provided and the determining means may be operable to determine the location of the object by comparison of the field strength of the signal received at three or more different receiver locations.

The receiver antenna may be a directional antenna and the means for determining may be operable to use the directionality of the receiver to determine the relative directional position of the reflecting target. More specifically, the direction of reflected signal propagation may be determined by aligning a highly directional antenna.

Radiated wavelength is one of the aspects of remote sensing that determines the positional resolution of the system. In air propagating radar systems high frequencies with short wavelengths are used to achieve good positional resolution. In the underwater environment, attenuation increases with frequency. This limits the use of high frequencies over a useful range. The relative permittivity of water helps to some extent since this results in a substantial decrease in wavelength in water compared to air propagation at the same frequency. At 100 kHz air wavelength is 3 km while in water it is around 300 m. To overcome this problem, in one implementation of the invention continuous wave techniques are used to vary the frequency of the probe signal by, for example, starting at a high frequency and reducing it gradually until a return signal is detected. In the event that a return signal is detected the receiver is then moved closer to the target and the frequency increased. At this higher frequency spatial resolution is improved.

For the short-range applications envisaged, it will not be practical to measure propagation time of a reflected pulse. The frequency of operation will not be high enough to define a pulse of short enough duration. In one implementation of a remote sensing system frequency modulated continuous wave techniques are used. The frequency of the electromagnetic radiation can be rapidly ramped over time. This results in a reflected signal with a frequency offset proportional to range.

The receiver may be remotely located from the transmitter, or may be co-located. For example, the transmitter and receiver may both be located on a mobile, remote sensing station that is operable to move around in an underwater environment.

The location of the object may be determined relative to at least one of the receiver, the transmitter or a pre-determined reference.

The transmitted signal may have a frequency of below 3 MHz. The transmitted signal may have a frequency in the range of 1 MHz to 3 MHz.

According to another aspect of the present invention, there is provided a system for determining underwater electromagnetic signal propagation direction comprising at least one receiver for receiving the electromagnetic signal and determining means for determining the direction of propagation using field strength at three or more receiver locations.

Three or more receiver antennas may be provided and the determining means may be operable to determine the location of the object by comparison of the field strength received at each antenna.

Alternatively, a single receiver antenna may be provided and the determining means may be operable to determine the location of the object by comparison of the field strength received at three or more different receiver locations.

BRIEF DESCRIPTION OF DRAWINGS

Various aspects of the invention will now be described by way of example only and with reference to the accompanying drawings, of which.

The present invention relates to an underwater remote sensing system. The underwater environment is very different from air and requires completely new detection techniques from those applicable for air propagation systems. This is primarily because water exhibits a high dielectric permittivity and conductivity that leads to high attenuation. In practice this means that the water operational range is generally less than one wavelength and so sub-wavelength resolution techniques have to be used.

Figure 1:
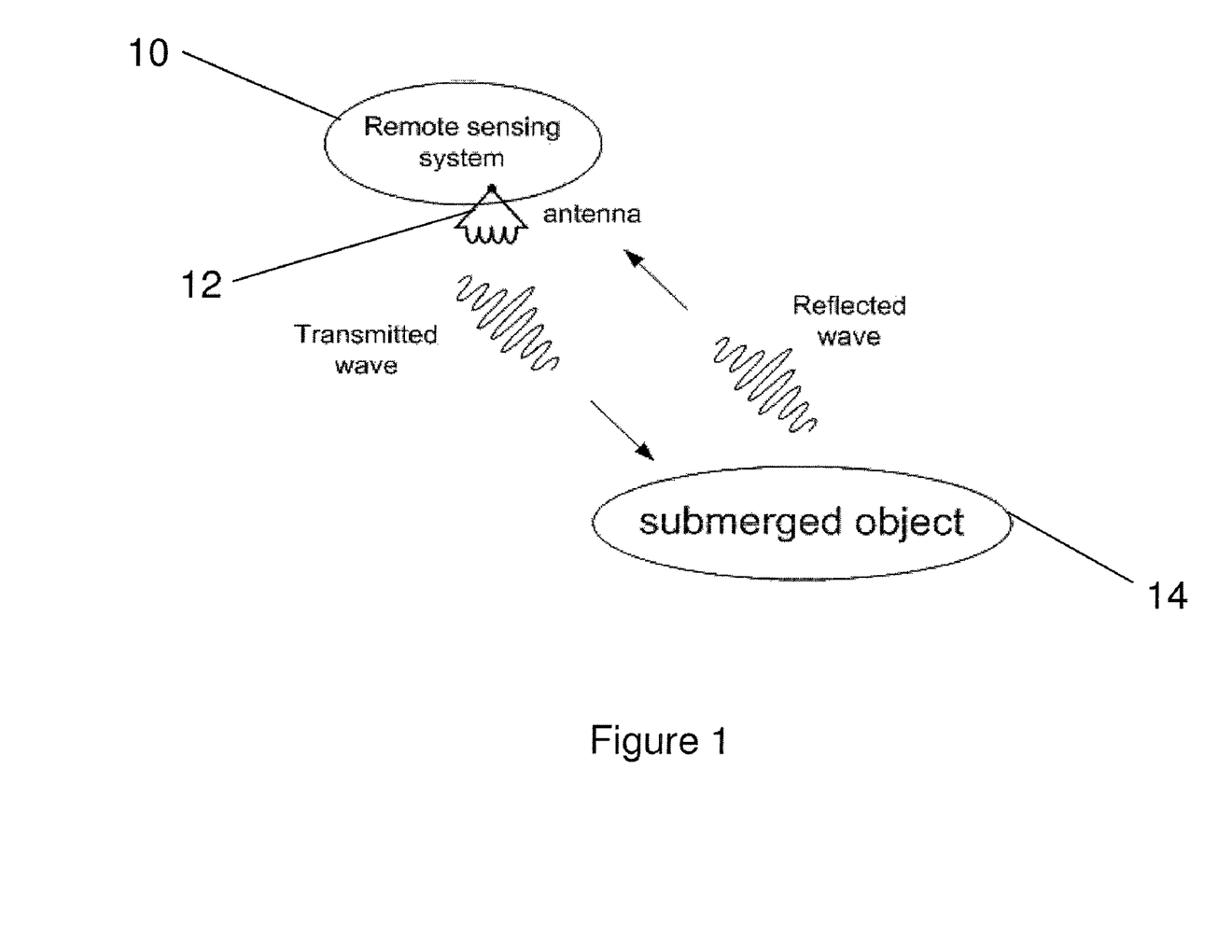
FIG. 1 shows an operational illustration of an electromagnetic remote sensing underwater system.
Figure 2:
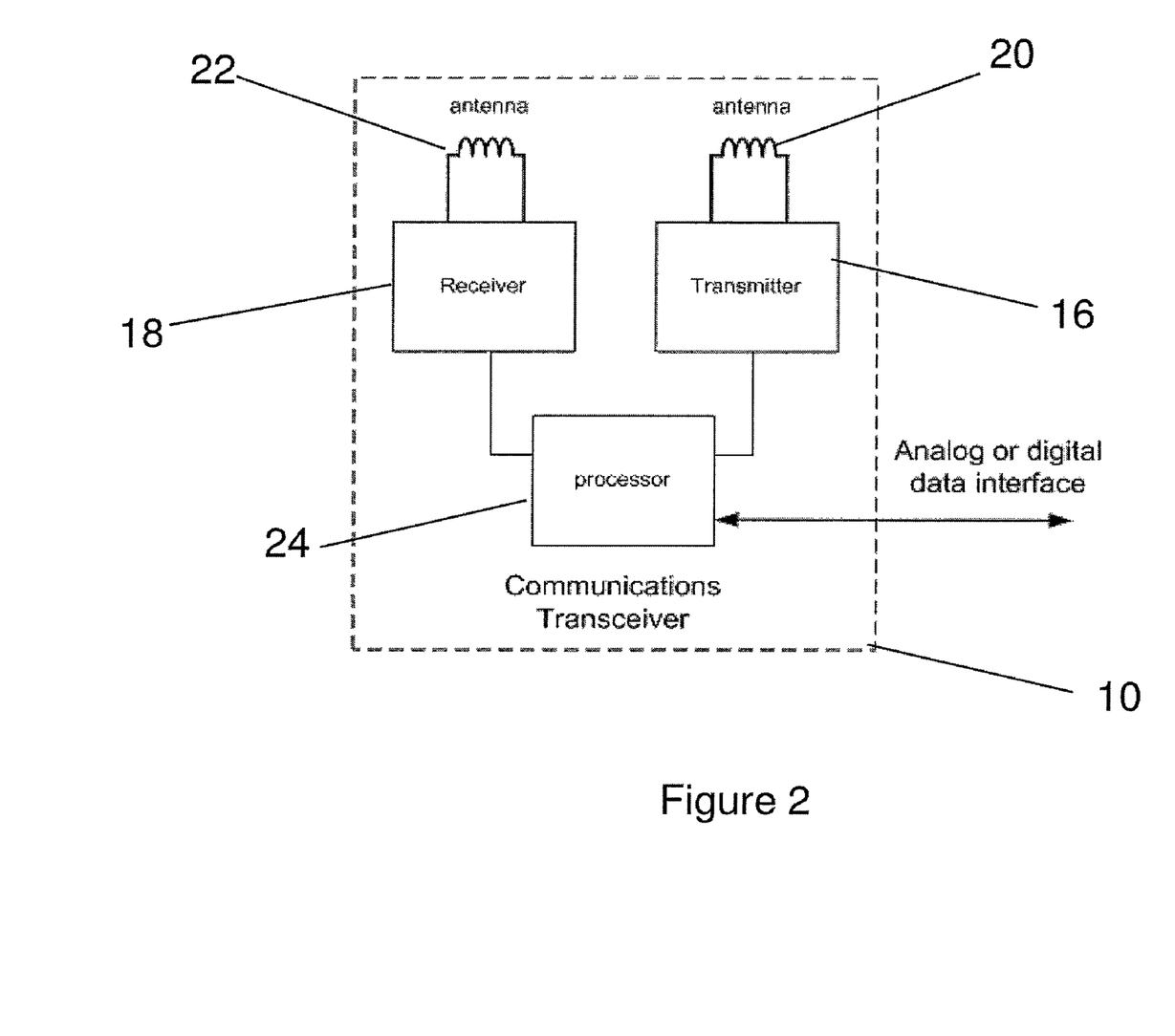
FIG. 2 is a block diagram of an underwater navigation system.

FIG. 1 shows a remote sensing system 10 that is operable to transmit an electromagnetic signal using an electrically insulated magnetic coupled antenna 12, and subsequently receive any radiation reflected from an object 14 that is on the propagation path of the transmitted signal. FIG. 2 shows the sensing system 10 of FIG. 1 in more detail. This includes a transmitter 16 and a receiver 18 both of which have an electrically insulated magnetic coupled antenna 20 and 22 respectively. Connected to both of the transmitter 16 and the receiver 18 is a processor 24 that carries out signal processing of the received signal to calculate target properties. The processor 24 has a data interface (not shown) for providing remote sense data to related sub-systems. Although the transmitter and receiver 16 and 18 are shown as being co-located on the remote sensing station 10, this is not essential, and instead the transmitter and receiver 16 and 18 could be provided at different locations.

Figure 3:
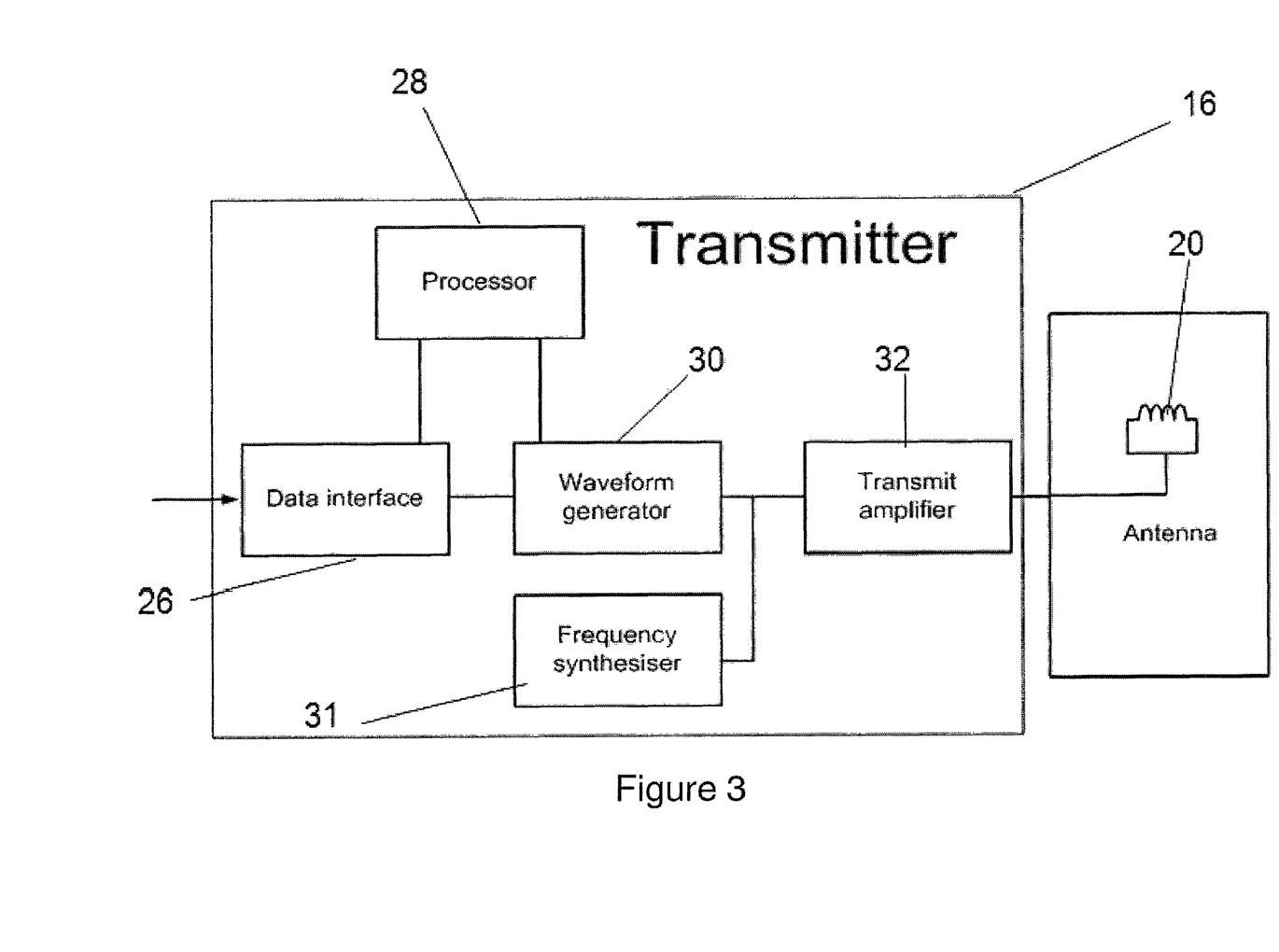
FIG. 3 is a block diagram of an underwater transmitter for use in the underwater remote sensing system of FIG. 2.

FIG. 3 shows an example of a transmitter 16 for use in the remote sensing station 10 of FIG. 2. This has a data interface 26 that is connected to each of a processor 28 and a waveform generator 30. The waveform generator 30 provides the amplitude or frequency modulation of a carrier wave that is required for various remote sensing techniques. At an output of the wave generator 30 are a frequency synthesiser 31 that provides a local oscillator signal for up-conversion of the carrier signal and a transmit amplifier 32, which is connected to the underwater, electrically insulated magnetic coupled antenna 20. In use, the processor 28 is operable to cause electromagnetic waveforms to be transmitted as required by the particular remote sensing technique in use. Typically, the electromagnetic signals have a frequency that is less than 3 MHz.

Figure 4:
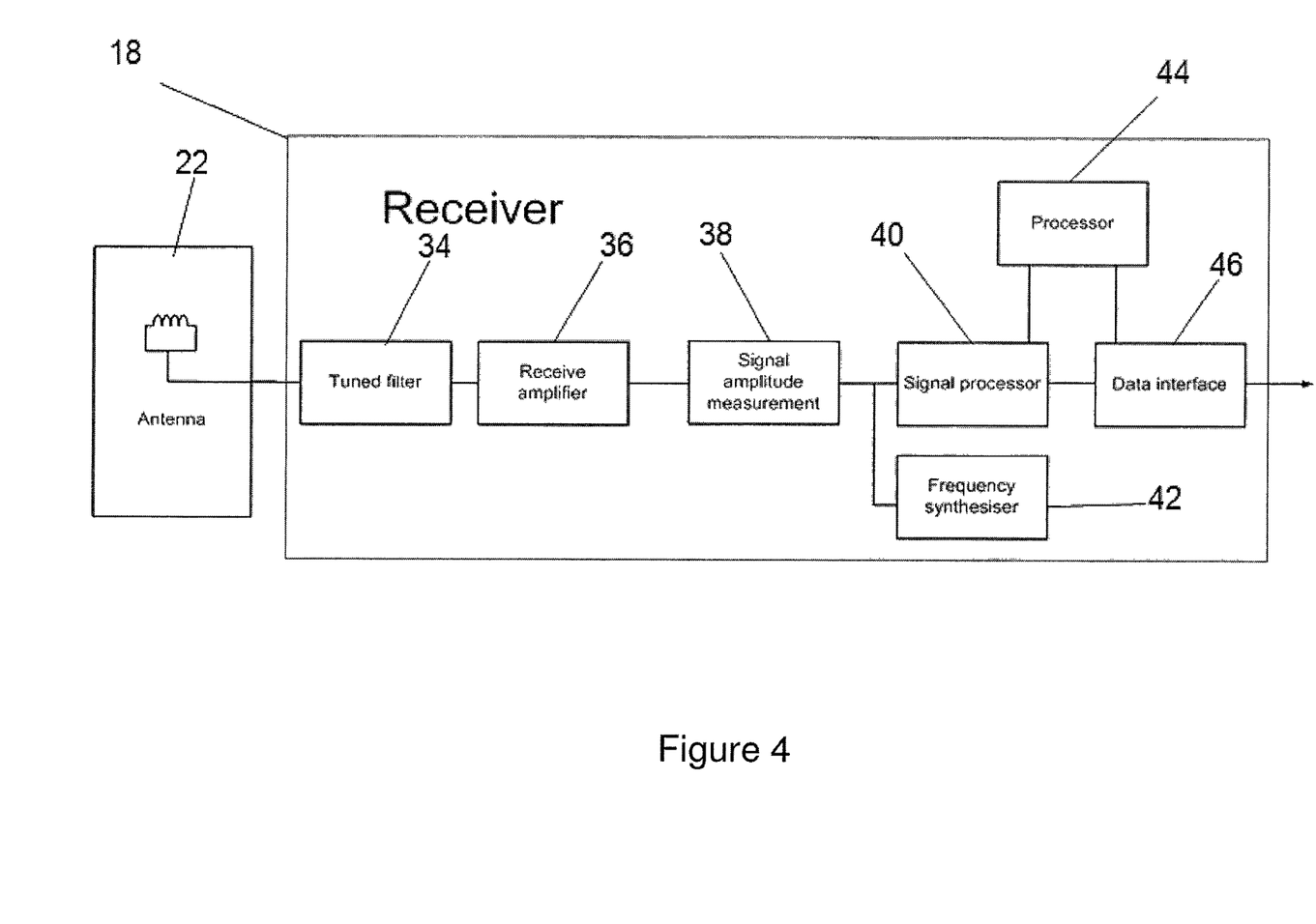
FIG. 4 is a block diagram of an underwater receiver for use in the remote sensing system of FIG. 2.

FIG. 4 shows an example of a receiver 18 for use in the remote station 10 of FIG. 2. This is operable to amplify the returned signal and minimise any interference such as from noise, the transmitted signal or external sources. As noted previously, the receiver 18 has an electrically insulated magnetic coupled antenna 22 adapted for underwater usage. This antenna 22 is operable to receive electromagnetic field signals from the transmitter antenna 20 that have been reflected from a target. Connected to the antenna 22 is a tuned filter 34 that is in turn connected to a receive amplifier 36. At the output of the amplifier 36 are a signal amplitude measurement module 38 that is coupled to a signal processor 40 and a frequency synthesiser 42 that provides a local oscillator signal for down conversion of the carrier. Connected to the signal processor 40 is a data processor 44 that is in turn connected to a data interface 46. The data interface 46 is provided for transferring data from the receiver 18 to a control or monitoring means (not shown), which may be located in the sensing station 10 or at another remote location. This is operable to take the raw information provided by the receiver and extract the information relating to the presence and/or location of objects. Techniques for doing this will be described later.

Figure 5:
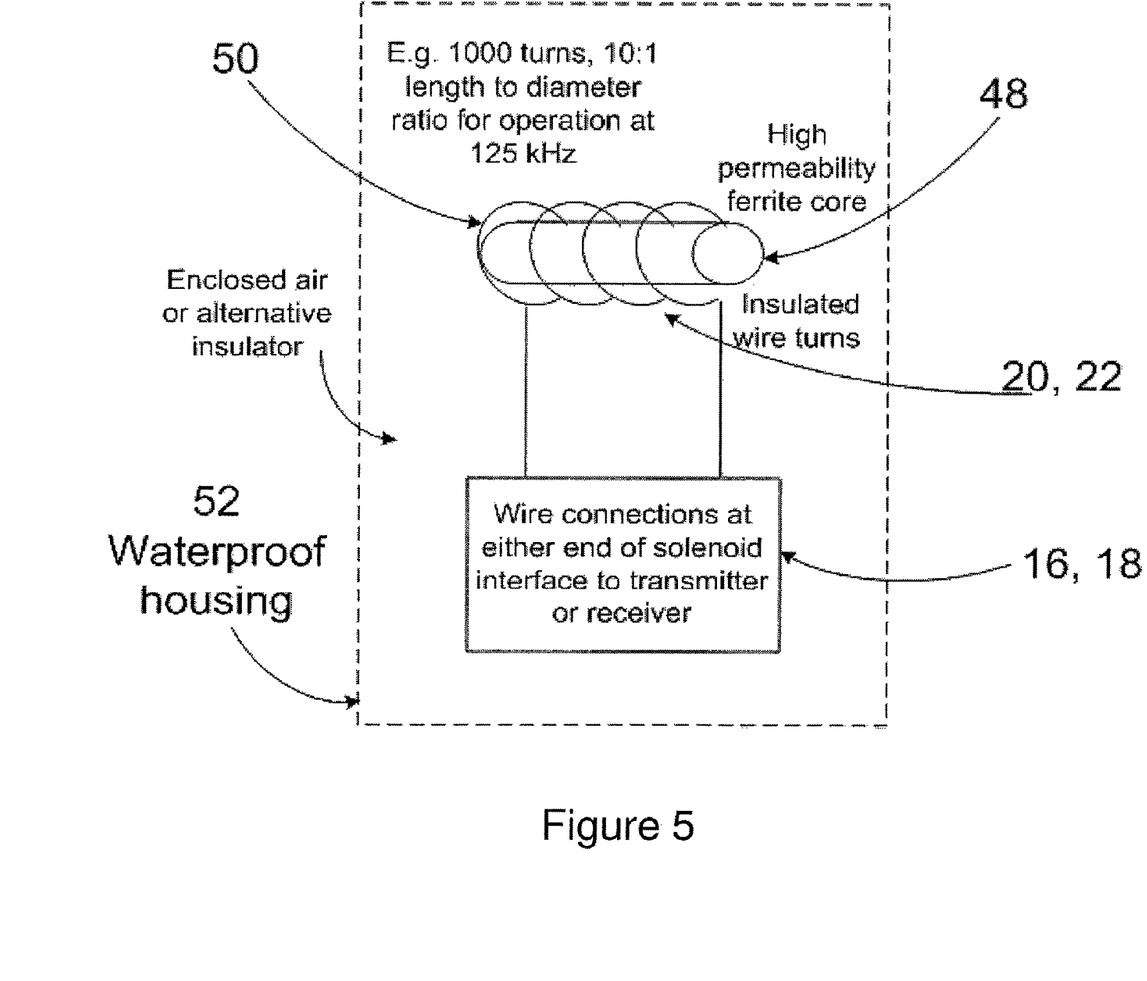
FIG. 5 is a diagrammatic representation of a magnetically coupled solenoid antenna in a waterproof enclosure for use in the transmitter of FIG. 3 and the receiver of FIG. 4.

FIG. 5 shows an example of an electrically insulated, magnetic coupled antenna 20, 22 that can be used in the transmitter and receiver of FIGS. 3 and 4. This has a high permeability ferrite core 48. Wound round the core 48 are multiple loops 50 of an insulated wire. The number of turns of the wire and length to diameter ratio of the core 48 can be selected depending on the application. However, for operation at 125 kHz, one thousand turns and a 10:1 length to diameter ratio is suitable. The antenna 20, 22 is connected to the relevant transmitter 16 or receiver 18 and is included in a waterproof housing 52. Of course, whilst the transmitter and receiver 16 and 18 respectively are shown as having separate antennas, it will be appreciated that a single antenna could be used. Within the housing 52 the antenna may be surrounded by air or some other suitable insulator, for example, an impedance-matched low conductivity medium such as distilled water.

Figure 6:
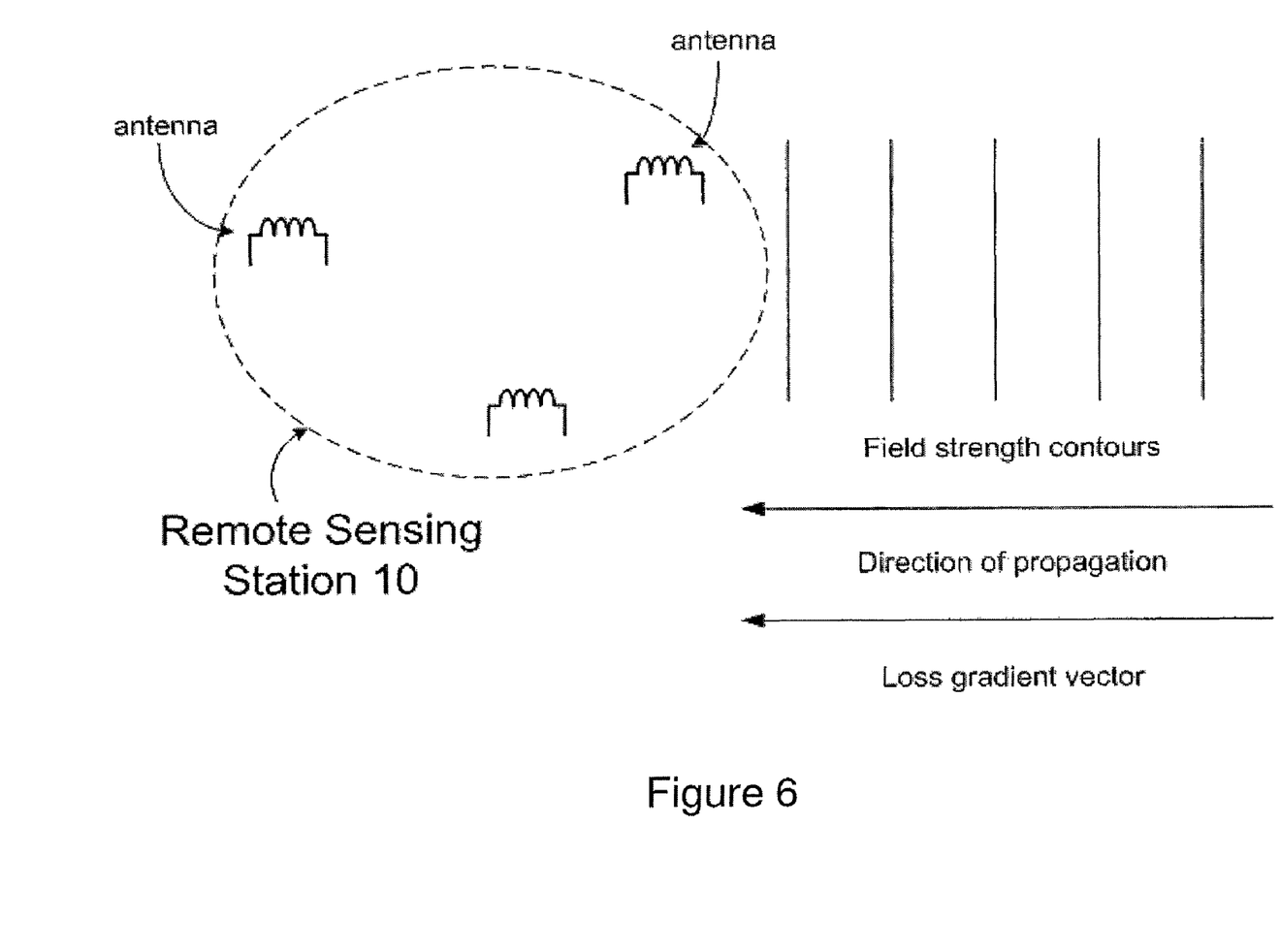
FIG. 6 is a diagrammatic representation of a direction finding technique.

Direction-finding techniques are employed to determine a relative bearing of a reflecting target. Because the field strength is attenuated in the direction of propagation, the bearing of the target relative to the receiver can be determined by calculating a local two-dimensional loss gradient vector using a comparison of the field strength at three or more receiver positions, as shown in FIG. 6. This can be done either by measuring the reflected signal at three or more different locations using a single receiver antenna, as shown in FIG. 2, or by using three or more receiver antennas on the remote sensing station. The relative position of the target can be determined using standard triangulation techniques based on the measurement of three or more bearings distributed over a larger area.

Figure 7:
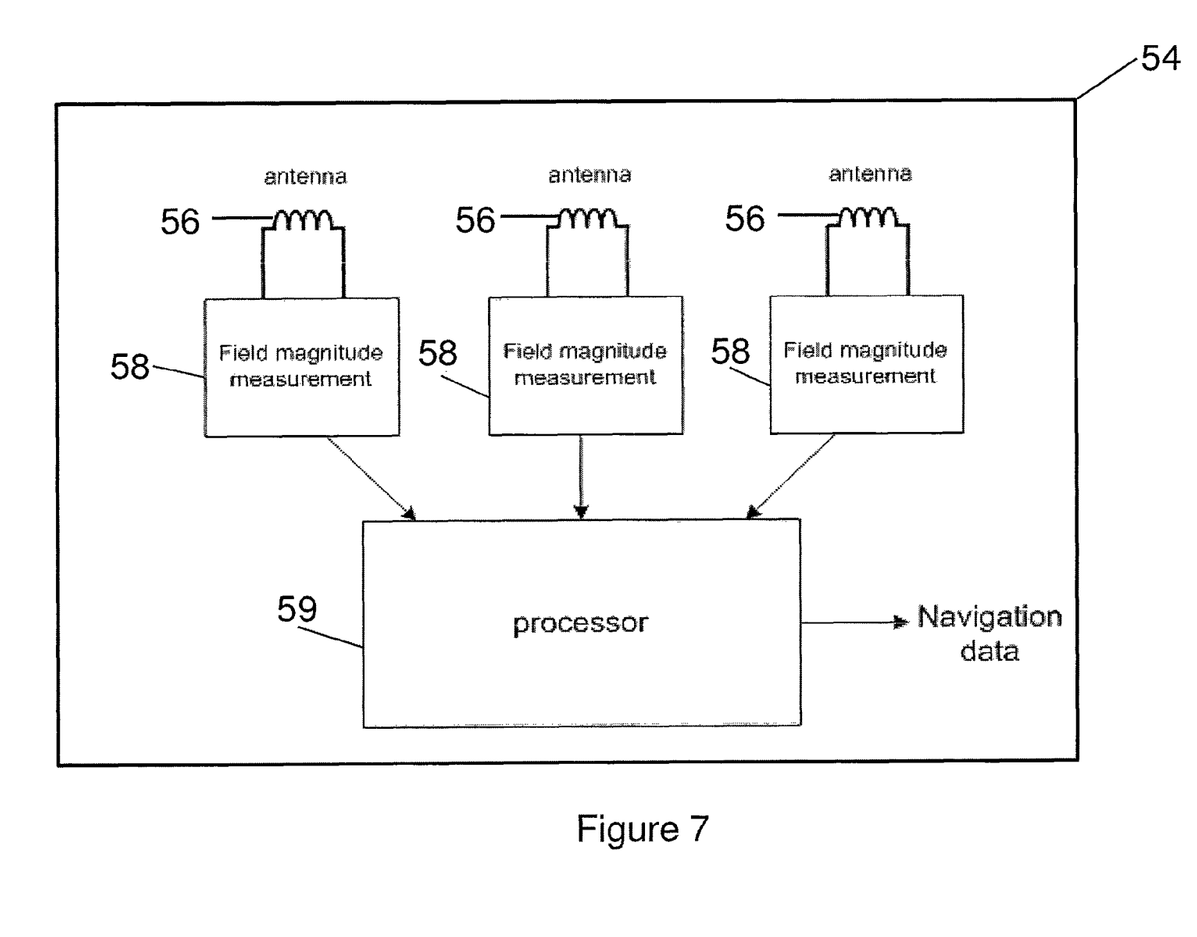
FIG. 7 is a block diagram of a receiver arrangement for use in the technique of FIG. 6.

FIG. 7 shows a simplified example of a remote sensing station 54 that has three electrically insulated magnetic coupled receiver antennas 56. Connected to each antenna 56 is a field magnitude measurement module 58 for measuring the field strength of the reflected signal that is received at each antenna 56. The measured magnitude data is made available to a processor 58 in the station 10. Because of the relatively high signal attenuation in the underwater environment, differences in signal magnitude will be measurable within the dimensions of a typical mobile, remote sensing station 54 that might, for example, accommodate three antennas at the vertices of an equilateral triangle with, for example a separation of two metres. The loss vector can be calculated by simple geometry using an algorithm executed by the remote station processor. For three-dimensional bearing fixes, four antenna measurement positions would be needed, arranged with three-dimensional spacing.

Figure 8:
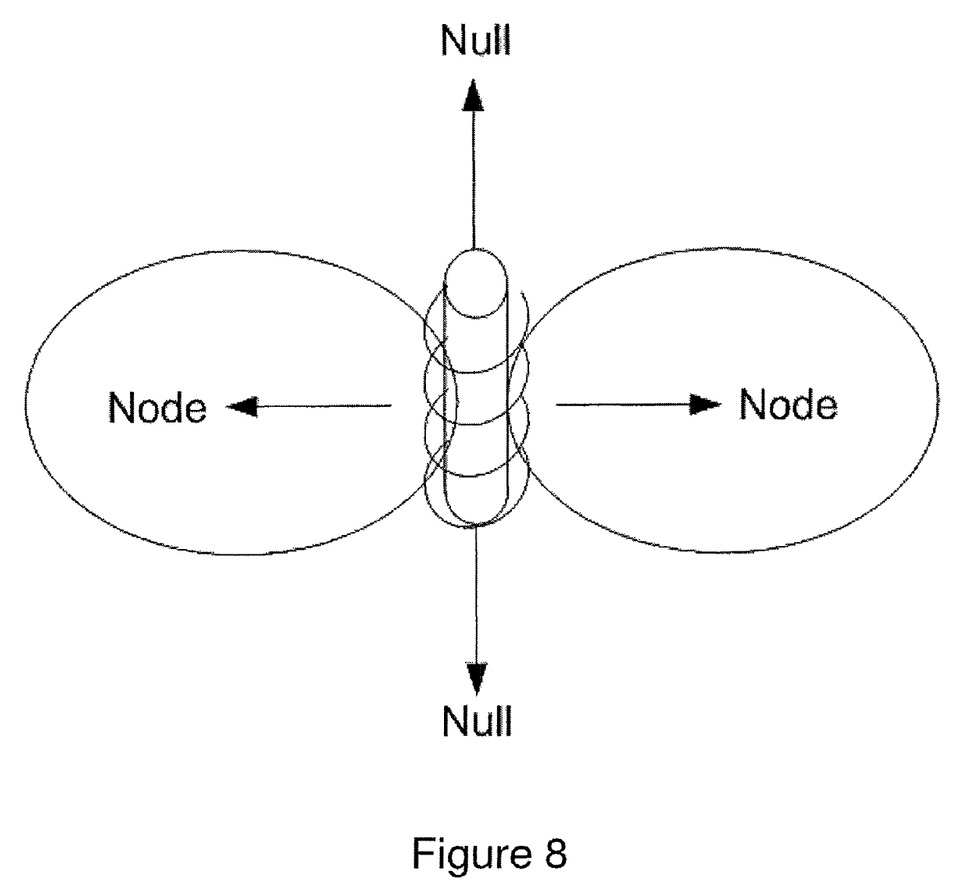
FIG. 8 is a diagrammatic representation of the field pattern produced by a magnetically coupled solenoid antenna.
Figure 9:
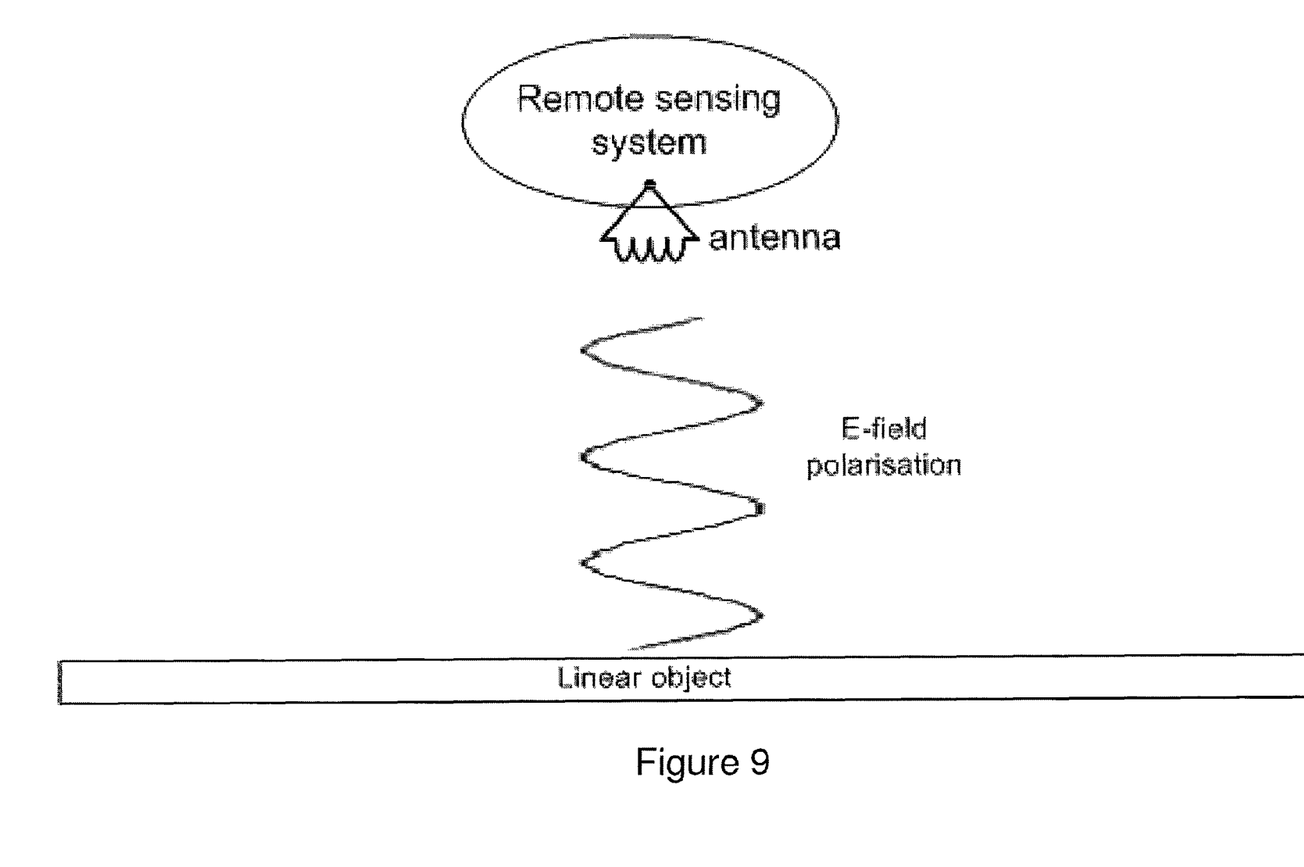
FIG. 9 is a diagram of E-field polarisation alignment to maximise reflections from a linear target.

Another direction finding technique that may be used involves using a directional antenna. An example of this is a solenoid type antenna, as illustrated in FIG. 8. This produces polarised propagating electromagnetic radiation. This is particularly useful when searching for a linear target, because the antenna could be rotated to produce a maximised reflected signal when the propagated E-field is aligned with the axis of the linear target as illustrated in FIG. 9. Rotation of the antenna may be effected in any suitable manner, for example by movement of the remote sensing station itself or by provision of a mechanism for rotation of the antenna independently of the remote sensing station.

Figure 10:
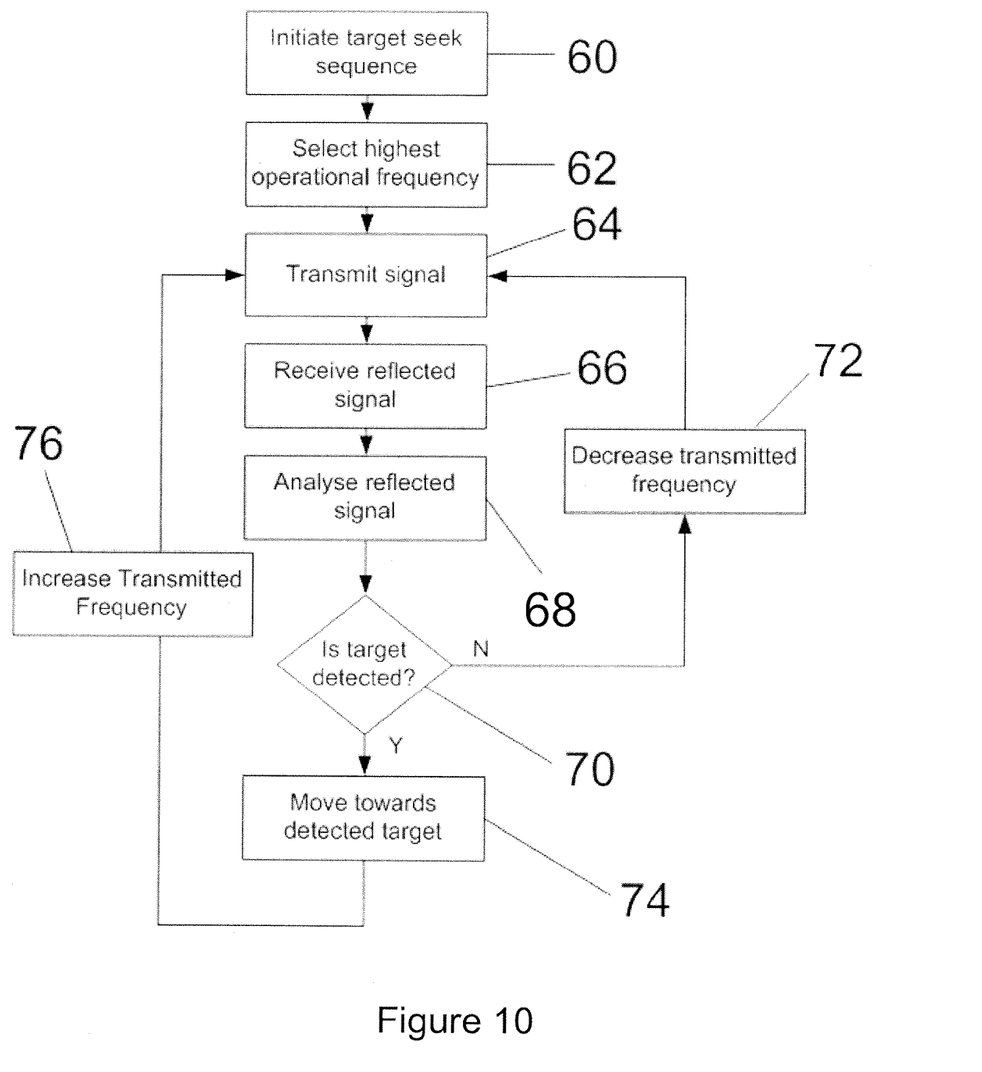
FIG. 10 is a flow diagram representation of a remote sensing target seeking sequence.

In practice, the remote sensing system in which the invention is embodied may be operable to use a range of different target seeking frequencies in order to focus in on targets and optimise sensing process. Low frequency offers greater range due to lower attenuation but also achieves lower positional resolution. In order to accurately locate an object by remote sensing, the process set out in FIG. 10 may be used. In this case, the target seek sequence is initiated 60 and the remote sense system starts the scan at its highest frequency of operation 62, for example 3 MHz. A signal at this frequency is then transmitted 64, and the receiver receives signals that have potentially been reflected by a target 66. These received signals are analysed 68 to determine whether a target has been detected 70. In the event that a target is not detected, the transmission signal frequency is decreased 72, and the process of transmitting and receiving signal repeated. This is continued until the system receives a return signal of interest 70. In the event that a signal of interest is detected, the remote sense station moves toward the detected target 74 and increases the radiated frequency 76. In this, way the positional resolution improves as the remote sense station approaches the target. This procedure could be used, for example, to find and track a buried pipeline.

A skilled person will appreciate that variations of the disclosed arrangements are possible without departing from the invention. For example, although position-finding techniques are described, it will be appreciated that analysis of reflected signals could be used to determine the surface properties of the detected object. Information regarding an object's shape can be deduced by looking at reflections from several incident angles since strong reflections are produced from objects presenting flat normally incident surfaces to a co-located transmitter receiver system. Also, as well as providing an indication of relative position, the remote sensing station may be operable to communicate the absolute position in space of an object found with reference to a standard co-ordinate system, for example latitude, longitude and altitude.

Whilst the primary function of the systems in which the invention is embodied is to find underwater objects, they could be used to implement underwater electromagnetic communications links. Also, whilst the systems and methods described are generally applicable to seawater, fresh water and any brackish composition in between, because relatively pure fresh water environments exhibit different electromagnetic propagation properties from saline, seawater, different operating conditions may be needed in different environments. Any optimisation required for specific saline constitutions will be obvious to any practitioner skilled in this area. Accordingly the above description of the specific embodiment is made by way of example only and not for the purposes of limitation. It will be clear to the skilled person that minor modifications may be made without significant changes to the operation described.

The invention claimed is:

1. An underwater remote sensing system comprising a transmitter for transmitting an electromagnetic signal, a receiver for receiving an electromagnetic signal reflected from an object and determining means for determining the location of the object using the received electromagnetic signal, the determining means being operable to determine the location of the object using signals received at three or more receiver positions, and wherein at least one of the transmitter and receiver is underwater.

2. An underwater remote sensing system as claimed in claim 1 wherein three or more receiver antennas are provided and the determining means are operable to determine the location of the object by comparison of the field strength of the signal received at each antenna.

3. An underwater remote sensing system as claimed in claim 1 wherein a single receiver antenna is provided and the determining means are operable to determine the location of the object by comparison of the field strength of the signal received at three or more different receiver locations.

4. An underwater remote sensing system as claimed in claim 1 wherein at least one of the receiver and transmitter has a magnetic coupled antenna.

5. An underwater remote sensing system as claimed in claim 1 wherein at least one of the receiver and transmitter has an electrically insulated antenna.

6. An underwater remote sensing system as claimed in claim 5 wherein each insulated antenna is surrounded by an impedance-matched low conductivity medium, for example distilled water.

7. An underwater remote sensing system as claimed in claim 1 wherein the receiver antenna is a directional antenna and the means for determining are operable to use the directionality of the receiver to determine the relative directional position of the reflecting object.

8. An underwater remote sensing system as claimed in claim 1 wherein means are provided for varying the frequency of the transmitted signal.

9. An underwater remote sensing system as claimed in claim 1 wherein the transmitter and receiver are operable to implement a communications link.

10. An underwater remote sensing system as claimed in claim 1 wherein the receiver shares an antenna with the transmitter.

11. An underwater remote sensing system as claimed in claim 1 wherein the receiver is remotely located from the transmitter.

12. An underwater remote sensing system as claimed in claim 1 wherein the transmitter and receiver are substantially co-located.

13. An underwater remote sensing system as claimed in claim 1 wherein the location of the object is determined relative to at least one of the receiver, the transmitter or a pre-determined reference.

14. An underwater remote sensing system as claimed in claim 1 wherein the transmitted signal has a frequency of below 3 MHz.

15. An underwater remote sensing system as claimed in claim 14 wherein the transmitted signal has a frequency in the range of 1 MHz to 3 MHz.

16. A system for determining underwater electromagnetic signal propagation direction comprising three or more receiver antennas for receiving the electromagnetic signal and determining means for determining the direction of propagation using field strength at three or more receiver locations of the received electromagnetic signal, and for determining the location of the object by comparison of the field strength received at each antenna, and wherein the at least one receiver is underwater.

17. A system as claimed in claim 16 wherein a single receiver antenna is provided and the determining means are operable to determine the location of the object by comparison of the field strength received at three or more different receiver locations.

* * * * *